(12) United States Patent
McCaffrey

(10) Patent No.: US 10,774,666 B2
(45) Date of Patent: Sep. 15, 2020

(54) TOGGLE SEAL FOR A RIM SEAL

(71) Applicant: United Technologies Corporation, Farmington, CT (US)

(72) Inventor: Michael G. McCaffrey, Windsor, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 582 days.

(21) Appl. No.: 15/113,319

(22) PCT Filed: Nov. 14, 2014

(86) PCT No.: PCT/US2014/065633
§ 371 (c)(1),
(2) Date: Jul. 21, 2016

(87) PCT Pub. No.: WO2015/112238
PCT Pub. Date: Jul. 30, 2015

(65) Prior Publication Data
US 2017/0009595 A1    Jan. 12, 2017

Related U.S. Application Data

(60) Provisional application No. 61/931,183, filed on Jan. 24, 2014.

(51) Int. Cl.
*F01D 11/00* (2006.01)
*F01D 5/30* (2006.01)
(Continued)

(52) U.S. Cl.
CPC .............. *F01D 11/006* (2013.01); *F01D 5/02* (2013.01); *F01D 5/12* (2013.01); *F01D 5/3015* (2013.01);
(Continued)

(58) Field of Classification Search
CPC .... F01D 11/001; F01D 11/003; F01D 11/005; F01D 11/006; F01D 5/02; F01D 5/12;
(Continued)

(56) References Cited

U.S. PATENT DOCUMENTS 2,488,875 A * 11/1949 Morley .................. F01D 9/042
                                                        415/136
3,768,924 A    10/1973 Andersen et al.
(Continued)

FOREIGN PATENT DOCUMENTS

EP    0501066 A1    9/1992
EP    1088963 A2    4/2001
(Continued)

OTHER PUBLICATIONS

International Search Report for Interantional Application No. PCT/US2014/065633; dated Feb. 24, 2015.
(Continued)

*Primary Examiner* — Mark A Laurenzi
*Assistant Examiner* — Loren C Edwards
(74) *Attorney, Agent, or Firm* — Cantor Colburn LLP

(57) ABSTRACT

A toggle seal, for use with a rim seal, including: a seal body, a proximal end and a distal end, a first end seal extending in a first axial direction from the proximal end of the seal body, a second end seal extending in the first axial direction from the distal end of the seal body, a first protruding portion extending in a second axial direction from the proximal end, opposite of the first end seal, and a second protruding portion extending in the second axial direction from the distal end, opposite of the second end seal, wherein the first end seal is configured to operatively engage the wheel disk and the second end seal is configured to operatively engage the at least one blade.

10 Claims, 3 Drawing Sheets

(51) Int. Cl.
*F01D 5/02* (2006.01)
*F01D 5/12* (2006.01)
*F02C 3/04* (2006.01)
*F04D 29/08* (2006.01)
*F04D 29/32* (2006.01)

(52) U.S. Cl.
CPC .......... *F01D 11/003* (2013.01); *F01D 11/005* (2013.01); *F02C 3/04* (2013.01); *F04D 29/083* (2013.01); *F04D 29/324* (2013.01); *F05D 2220/32* (2013.01); *F05D 2240/35* (2013.01); *F05D 2240/55* (2013.01); *F05D 2250/71* (2013.01); *Y02T 50/672* (2013.01)

(58) Field of Classification Search
CPC ........ F01D 5/3015; F02C 3/04; F04D 29/083; F04D 29/324; F05D 2240/11; F05D 2240/35
USPC .......................................................... 60/805
See application file for complete search history.

(56) References Cited

U.S. PATENT DOCUMENTS

| | | | |
|---|---|---|---|
| 4,247,257 A * | 1/1981 | Benoist | F01D 5/3015 416/220 R |
| 4,480,958 A * | 11/1984 | Schlechtweg | F01D 11/006 416/219 R |
| 4,854,821 A | 8/1989 | Kernon et al. | |
| 4,872,810 A * | 10/1989 | Brown | F01D 5/22 416/145 |
| 4,890,981 A | 1/1990 | Corsmeier et al. | |
| 5,169,289 A | 12/1992 | Lalanne | |
| 5,211,407 A | 5/1993 | Glynn et al. | |
| 5,256,035 A * | 10/1993 | Norris | F01D 5/3015 416/220 R |
| 5,503,528 A | 4/1996 | Glezer et al. | |
| 5,984,636 A | 11/1999 | Fahndrich et al. | |
| 7,238,008 B2 | 7/2007 | Normoyle et al. | |
| 8,172,514 B2 | 5/2012 | Durocher et al. | |
| 8,382,432 B2 | 2/2013 | Grissino et al. | |
| 2003/0099542 A1 * | 5/2003 | Czachor | F01D 11/005 415/189 |
| 2004/0062643 A1 | 4/2004 | Brauer et al. | |
| 2013/0004313 A1 | 1/2013 | El-Aini et al. | |
| 2013/0175230 A1 | 7/2013 | Spracher | |

FOREIGN PATENT DOCUMENTS

| | | |
|---|---|---|
| EP | 2441920 A2 | 4/2012 |
| GB | 2016092 A | 9/1979 |

OTHER PUBLICATIONS

Written Opinion for Interantional Application No. PCT/US2014/065633; dated Feb. 24, 2015.
EP Search Report for Application No. EP 14 87 9923.

* cited by examiner

US 10,774,666 B2

TOGGLE SEAL FOR A RIM SEAL

CROSS REFERENCE TO RELATED APPLICATION

This present application is a National Phase Application of Patent Application PCT/US2014/065633 filed on Nov. 14, 2014, which is related to and claims the priority benefit of U.S. Provisional Patent Application Ser. No. 61/931,183, filed Jan. 24, 2014. The contents of both of these applications are hereby incorporated by reference in their entirety into this application.

TECHNICAL FIELD OF THE DISCLOSED EMBODIMENTS

The presently disclosed embodiments generally relate to seals, and more particularly to a toggle seal for a rim seal.

BACKGROUND OF THE DISCLOSED EMBODIMENTS

In a gas turbine engine, rotating elements, such as compressor and turbine rotors, operate at a very high rotational speed. Their blades are also subjected to intense pressure and heat.

Compressor and turbine rotors are mounted between non-rotating structures within the engine. These structures are designed to be as close as possible to the rotating blade platforms, with a rim seal placed between the rotor and the non-rotating structure. This mitigates pressurized air ingestion inside the gas turbine engine.

Although various rim seal arrangements have been suggested in the past, improvements in rim seal designs are needed in the art

BRIEF SUMMARY OF THE DISCLOSED EMBODIMENTS

In one aspect, a toggle seal for a rim seal is disclosed, the toggle seal including: a seal body including a seal body axis extending substantially perpendicular to a rotational axis to define a first axial direction extending from a first side of the seal body axis and a second axial direction extending from a second side of the seal body axis; a proximal end and a distal end. A first end seal extending in the first axial direction from the proximal end of the seal body, a second end seal extending in the first axial direction from the distal end of the seal body, and a protruding portion extending in the second axial direction from the distal end, opposite of the second end seal. In one embodiment, the first protruding portion is substantially rounded. In one embodiment, at least a portion of the first seal end is substantially rounded. In one embodiment, at least a portion of the second seal end is substantially rounded. The seal body further including at least one aperture disposed therein.

In another aspect, a rotor assembly is disclosed, including: a disk operative to rotate around a rotational axis, a plurality of blades affixed to the disk, and a rim seal positioned adjacent to the disk. The disk further including a plurality of disk arms. The rim seal including a toggle seal, and at least one plate seal, each of the at least one plate seal including a plate seal interior side and a plate seal exterior side, wherein the plate seal interior side is positioned adjacent to at least one of the plurality of blades. One of the plurality of disk arms penetrates a respective one of the at least one apertures of the toggle seal. The first end seal, of the toggle seal, is operatively in contact with the disk, and the second end seal is operatively in contact with plate seal exterior side.

In another aspect, a gas turbine engine is disclosed, including: a compressor section, a combustor section, and a turbine section in axial flow communication, at least one of the compressor section and turbine section including a disk operative to rotate around a rotational axis, a plurality of blades affixed to the disk, and a rim seal positioned adjacent to the disk a plurality of blades affixed to a disk, a rim seal positioned adjacent to the disk, wherein the rim seal includes at least one toggle seal and at least one plate seal, each of the at least one plate seal including a plate seal interior side and a plate seal exterior side, wherein the plate seal interior side is positioned adjacent to at least one of the plurality of blades. The first end seal end is operatively placed in contact with the wheel disk. The second end seal is operatively placed in contact with the plat seal exterior side of each of the at least one plate seals. At least one split lock ring may be placed between each toggle seal and a tab of each disk arm. At least one split lock ring may be placed between each of the plate seals positioned aft of each of the plurality of blades and the tab of each disk arm.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DRAWINGS

Figure 1:
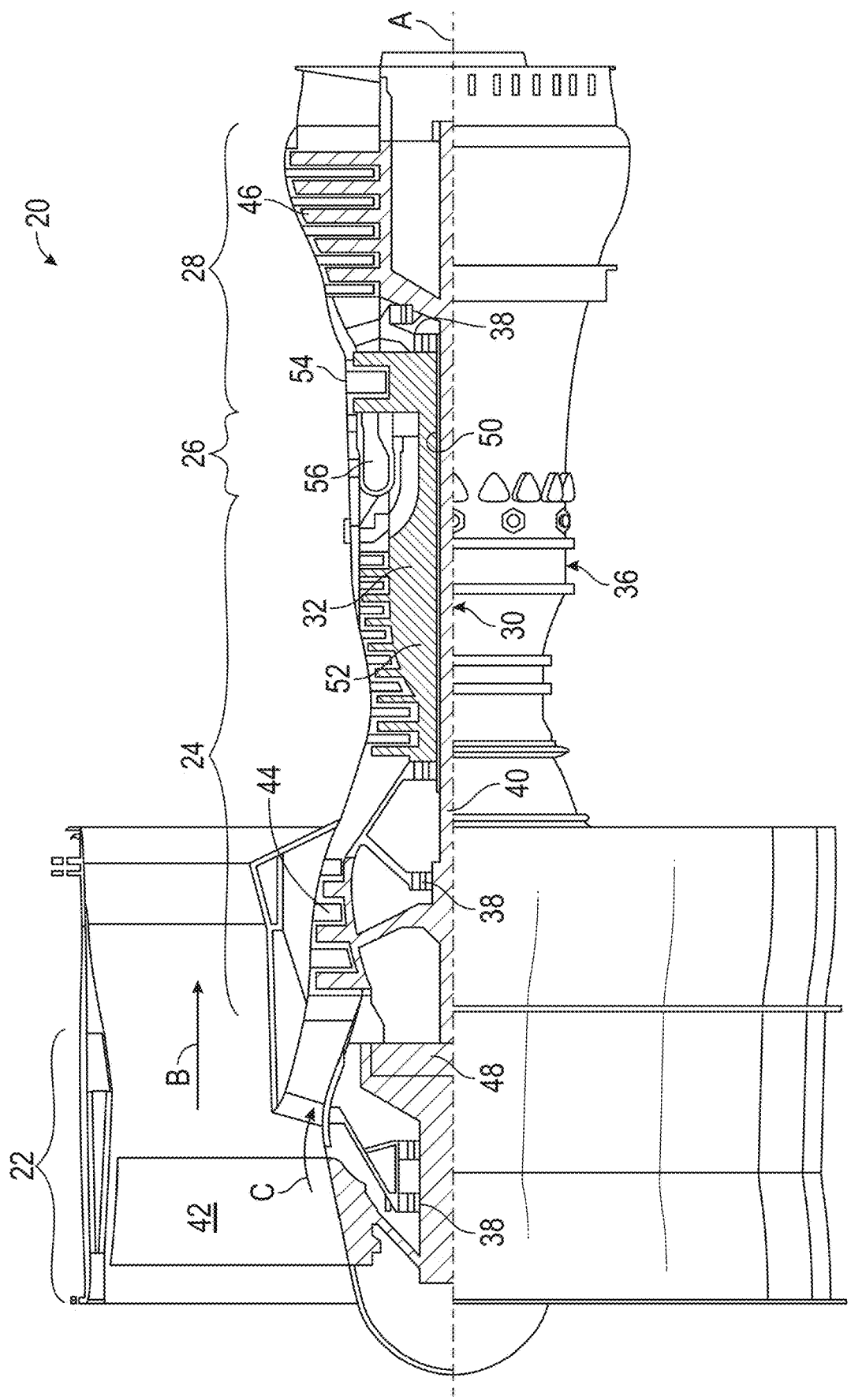
FIG. 1 is a general schematic view of a gas turbine engine.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates a typical architecture for a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
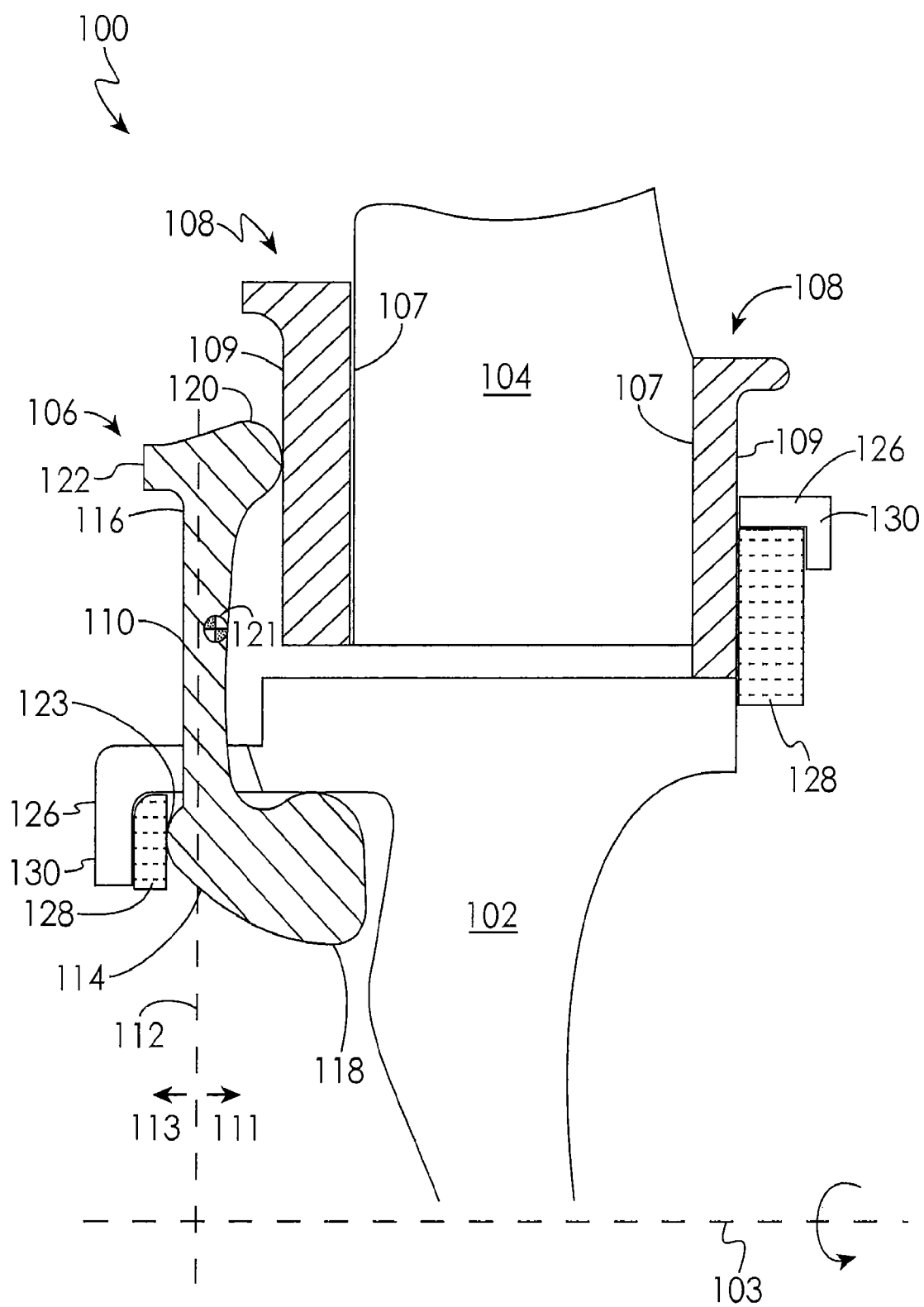
FIG. 2 is a schematic cross-sectional diagram of a rim seal used with a disk according to an embodiment of the present disclosure.
Figure 3:
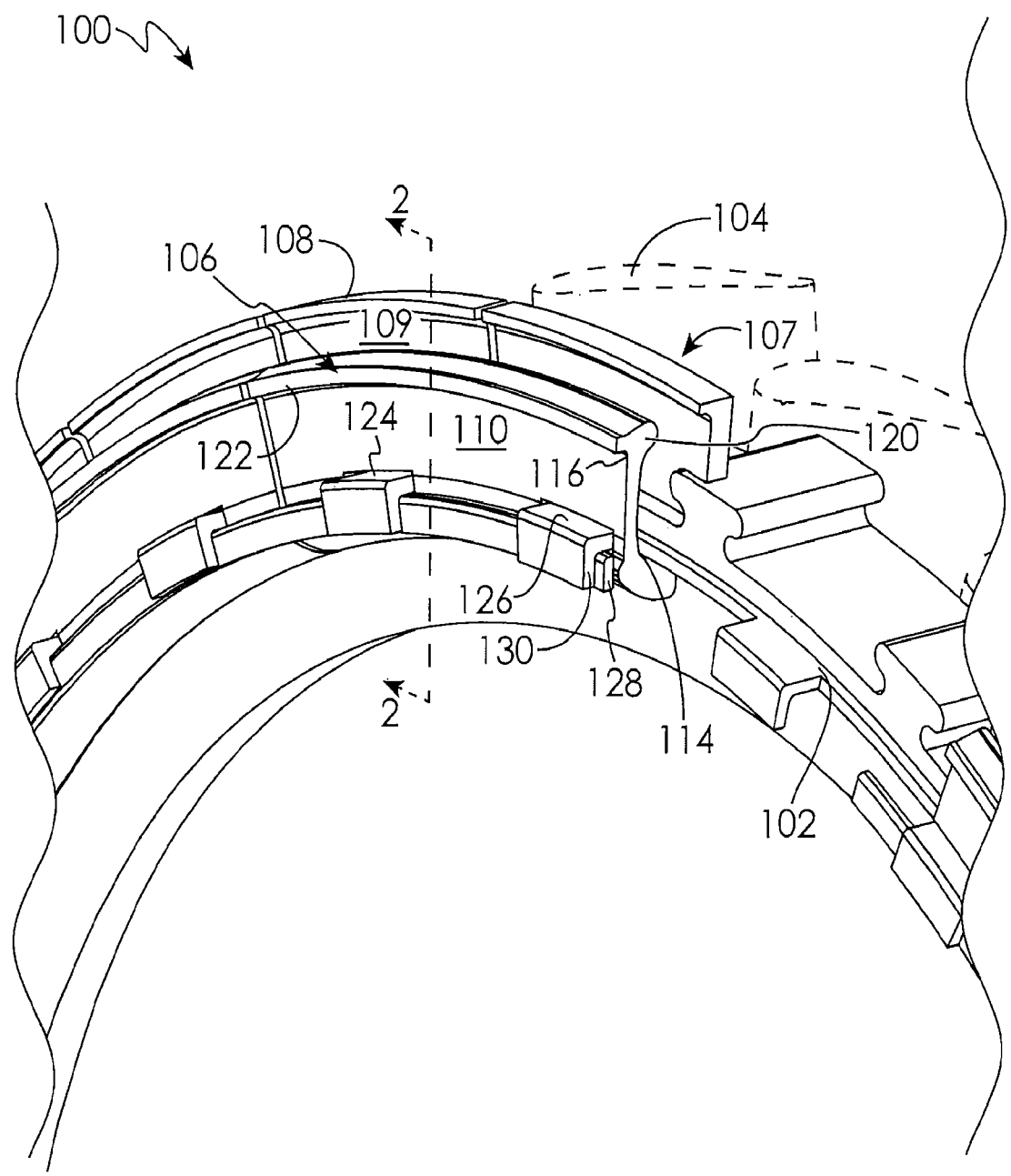
FIG. 3 is a schematic perspective diagram of a rim seal used with a disk An overview of the features, functions and/or configuration of the components depicted in the figures will now be presented. It should be appreciated that not all of the features of the components of the figures are necessarily described. Some of these non-discussed features, as well as discussed features are inherent from the figures. Other non-discussed features may be inherent in component geometry and/or configuration.

FIG. 2 schematically illustrates a cross-sectional view of a rim seal 100 in use with a wheel disk 102 and blades 104. FIG. 3 schematically illustrates a perspective view of the rim seal 100 in use with the wheel disk 102 and blades 104. The wheel disk 102 includes a plurality of radially interspaced blades 104. In one embodiment, the blades 104 comprise turbine blades. The wheel disk 102 and the plurality of radially interspaced blades 104 are configured to rotate around a rotational axis 103. The rim seal 100 is formed from at least one toggle seal 106 and at least one plate seal 108. In one embodiment, a plurality of toggle seals 106 and a plurality of plate seals 108 extend around a circumference of the wheel disk 102 to form an essentially continuous rim seal 100 therearound. In one embodiment, each toggle seal 106 and each plate seal 108 may be formed from any durable material, such as a nickel-based alloy, cobalt-based alloy, iron-based alloy, molybdenum-based alloy, titanium-based alloy, ceramic, or ceramic matrix composite, to name a few non-limiting examples.

Each plate seal 108 includes an interior side 107 and an exterior side 109. Each toggle seal 106 is formed from a seal body 110 including a seal body axis 112. The seal body axis 112 extends substantially perpendicular to the rotational axis 103 to define a first axial direction 111 extending from a first side of the seal body axis 112 and a second axial direction 113 direction extending from a second side of the seal body axis 112. The toggle seal 106 further includes a proximal end 114 and a distal end 116. A first end seal 118 extends in the first axial direction 111 from the proximal end 114 of the seal body 110. In one embodiment, the first end seal 118 contacts a portion of the wheel disk 102. A second end seal 120 extends in the first axial direction 111 from the distal end 116 of the seal body 110. In one embodiment, the second end seal 120 contacts the adjacent plate seal 108. In one embodiment, at least a portion of the first end seal 118 is substantially rounded. In one embodiment, at least a portion of the second end seal 120 is substantially rounded. It will be appreciated that the first end seal 118 and second end seal 120 may be formed in any shape, for example substantially curved, and spherical, to name a few non-limiting examples, to aid in minimizing the wear of the first end seal 118 and second end seal 120 and to allow the toggle seal 100 to move in the first axial direction 111 and second axial direction 113 relative to the thermal growth differences between the wheel disk 102 and the blades 104 with minimal change in loading and/or contact stress between the mating parts. A first protruding portion 123 extends in the second axial direction 113 from the proximal end 114. In one embodiment, the first protruding portion is substantially rounded. It will be appreciated that the protruding portion 123 may be formed in any shape, for example substantially curved, and spherical, to name a few non-limiting examples, to aid in minimizing the wear of the first protruding portion 123 and to allow the toggle seal 100 to move in the first axial direction 111 and second axial direction 113 relative to the growth differences between the wheel disk 102 and the blades 104 with minimal change in loading and/or contact stress between the mating parts. A second protruding portion 122 extends in the second axial direction 113 from the distal end 116. By changing the length that the protruding portion 122 extends from the seal body axis 112, the location of the center of gravity 121 of each toggle seal 106 may be changed. By changing the center of gravity 121 of the toggle seal 106, an axial preload may be adjusted based on the location of the center of gravity 121 and the relative support surfaces of the wheel disk 102 and respective plate seal 108. In one embodiment, each toggle seal 106 includes at least one aperture 124 disposed in the seal body 110.

The interior side 107 of each plate seal 108 is placed adjacent to the blades 104 on each side of the wheel disk 102. In one embodiment, the plate seals 108 are configured to be integrated with the wheel disk 102. In one embodiment, the first end seal 118 is configured to operatively engage the wheel disk 102. The wheel disk 102 may include at least one disk arm 126, each having a respective tab 130 extending therefrom. In one embodiment, each of the at least one disk arms 126 penetrates a respective one of the at least one aperture 124 disposed in the seal body 110 of each toggle seal 106. At least one split lock ring 128 may be placed between each toggle seal 106 and the tab 130 of each disk arm 126 to secure the first end seal 118 to the wheel disk 102. In another embodiment, the at least one split lock ring 128 may be placed between each of the plate seals 108 positioned in the second axial direction 113 from the blade 104 to secure the plate seal 108 to the wheel disk 102.

It will be appreciated that as the wheel disk 102 and blades 104 thermally expand at different rates, the seal body 110 may flex in the second axial direction 113 such that the contact points with the wheel disk 102 and plate seals 108 can adapt to the axial changes without substantially affecting the load imposed by the rim seal 100.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A rotor assembly comprising:
   a disk operative to rotate around a rotational axis, the disk comprising a plurality of disk arms extending in an axial direction therefrom;
   a plurality of blades affixed to the disk;
   a rim seal positioned adjacent to the disk; and
   at least one split lock ring;
   wherein the rim seal comprises at least one toggle seal and at least one plate seal;
   wherein each toggle seal comprises:
   a seal body including a proximal end, a distal end and a seal body axis extending perpendicular to the rotational axis to define a first axial direction extending from a first side of the seal body axis towards the disk and a second axial direction extending from a second side of the seal body axis away from the disk;
   a first end seal extending in the first axial direction from the proximal end of the seal body;
   a second end seal extending in the first axial direction from the distal end of the seal body;
   a first protruding portion extending in the second axial direction from the proximal end, opposite of the first end seal; and
   a second protruding portion extending in the second axial direction from the distal end, opposite of the second end seal; and
   at least one aperture extending through the seal body, the at least one aperture being located between the first protruding portion and the second protruding portion;
   wherein each plate seal comprises a plate seal interior side facing towards one of the plurality of blades and a plate seal exterior side facing away from the one of the plurality of blades, wherein the plate seal interior side is positioned adjacent to the at least one of the plurality of blades;
   wherein one of the plurality of disk arms penetrates the at least one aperture in the seal body and the split lock ring is positioned between the first protruding portion and a tab of the disk arm; and
   wherein the first end seal of each toggle seal is configured to operatively engage the disk and the second end seal of each toggle seal is configured to operatively engage the at least one plate seal so as to be operatively in contact with the plate seal exterior side.

2. The rotor assembly of claim 1, wherein the disk, plurality of blades, and rim seal are configured to be used in assemblies selected from the group consisting of: turbine and compressor.

3. The rotor assembly of claim 1, wherein the toggle seal is formed from a material selected from the group consisting of: nickel-based alloy, cobalt-based alloy, iron-based alloy, molybdenum-based alloy, titanium-based alloy, ceramic, and ceramic matrix composite.

4. The rotor assembly of claim 1, wherein the first protruding portion is rounded.

5. The rotor assembly of claim 1, wherein at least a portion of the first seal end is rounded.

6. The rotor assembly of claim 1, wherein at least a portion of the second seal end is rounded.

7. A gas turbine engine, comprising:
   a compressor section, a combustor section, and a turbine section in axial flow communication, at least one of the compressor section and turbine section comprising:
   a disk operative to rotate around a rotational axis, the disk comprising a plurality of disk arms extending in an axial direction therefrom;
   a plurality of blades affixed to the disk;
   a rim seal positioned adjacent to the disk; and
   at least one split lock ring;
   wherein the rim seal comprises at least one toggle seal and at least one plate seal;
   wherein each toggle seal comprises:
   a seal body including a proximal end, a distal end and a seal body axis extending perpendicular to the rotational axis to define a first axial direction extending from a first side of the seal body axis towards the disk and a second axial direction extending from a second side of the seal body axis away from the disk;
   a first end seal extending in the first axial direction from the proximal end of the seal body;
   a second end seal extending in the first axial direction from the distal end of the seal body;
   a first protruding portion extending in the second axial direction from the proximal end, opposite of the first end seal; and a second protruding portion extending in the second axial direction from the distal end, opposite of the second end seal; and at least one aperture extending through the seal body, the at least one aperture being located between the first protruding portion and the second protruding portion;

wherein each plate seal comprises a plate seal interior side facing towards one of the plurality of blades and a plate seal exterior side facing away from the one of the plurality of blades, wherein the plate seal interior side is positioned adjacent to the at least one of the plurality of blades;

wherein one of the plurality of disk arms penetrates the at least one aperture in the seal body and the split lock ring is positioned between the first protruding portion and a tab of the disk arm; and wherein the first end seal of each toggle seal is configured to operatively engage the disk and the second end seal of each toggle seal is configured to operatively engage the at least one plate seal so as to be operatively in contact with the plate seal exterior side.

8. The gas turbine engine of claim 7, wherein the first protruding portion is rounded.

9. The gas turbine engine of claim 7, wherein at least a portion of the first seal end is rounded.

10. The gas turbine engine of claim 7, wherein at least a portion of the second seal end is rounded.

* * * * *